United States Patent
Oike

(10) Patent No.: US 11,483,527 B2
(45) Date of Patent: Oct. 25, 2022

(54) METHOD OF OPERATION OF A CONTROL DEVICE CONFIGURED TO CONTROL A PLURALITY OF PROJECTORS AND CONTROL DEVICE

(71) Applicant: SEIKO EPSON CORPORATION, Tokyo (JP)

(72) Inventor: Takumi Oike, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/109,278

(22) Filed: Dec. 2, 2020

(65) Prior Publication Data

US 2021/0168342 A1    Jun. 3, 2021

(30) Foreign Application Priority Data

Dec. 2, 2019    (JP) .............................. JP2019-217729

(51) Int. Cl.
| | | |
|---|---|---|
| *H04N 9/31* | (2006.01) | |
| *G03B 21/00* | (2006.01) | |
| *G03B 21/14* | (2006.01) | |
| *G03B 21/26* | (2006.01) | |

(52) U.S. Cl.
CPC ........... *H04N 9/3182* (2013.01); *G03B 21/00* (2013.01); *G03B 21/14* (2013.01); *G03B 21/26* (2013.01); *H04N 9/3147* (2013.01); *H04N 9/3194* (2013.01)

(58) Field of Classification Search
CPC .. H04N 9/3182; H04N 9/3147; H04N 9/3194; G03B 21/00; G03B 21/14; G03B 21/26
See application file for complete search history.

(56) References Cited

U.S. PATENT DOCUMENTS

| | | | |
|---|---|---|---|
| 2012/0050698 A1 | 3/2012 | Kotani | |
| 2013/0307755 A1 | 11/2013 | Tomita | |
| 2016/0212393 A1* | 7/2016 | Fujioka | ............... H04N 9/3179 |
| 2017/0127028 A1 | 5/2017 | Oike et al. | |
| 2017/0208309 A1* | 7/2017 | Oike | ...................... H04N 9/315 |
| 2019/0045162 A1* | 2/2019 | Krestyannikov | ...... H04N 9/735 |
| 2019/0268579 A1 | 8/2019 | Oike et al. | |
| 2020/0072672 A1* | 3/2020 | Oike | ...................... G01J 3/0235 |

FOREIGN PATENT DOCUMENTS

| | | |
|---|---|---|
| JP | H 07-333760 | 12/1995 |
| JP | 2006-235158 | 9/2006 |
| JP | 2012-047849 | 3/2012 |
| JP | 2013-243515 | 12/2013 |
| JP | 2017-083672 | 5/2017 |

* cited by examiner

*Primary Examiner* — Magda Cruz
(74) *Attorney, Agent, or Firm* — Dority & Manning, P.A.

(57) ABSTRACT

A method of operation of a control device configured to control a plurality of projectors including the steps of making each of the plurality of projectors projects one or more first images based on first image information to a first area, and generating color correction data used to correct a color of images projected by the plurality of projectors based on imaging data generated by a camera imaging the first area where the first images are projected by the plurality of projectors.

7 Claims, 8 Drawing Sheets

METHOD OF OPERATION OF A CONTROL DEVICE CONFIGURED TO CONTROL A PLURALITY OF PROJECTORS AND CONTROL DEVICE

The present application is based on, and claims priority from JP Application Serial Number 2019-217729, filed Dec. 2, 2019, the disclosure of which is hereby incorporated by reference herein in its entirety.

BACKGROUND

1. Technical Field

The present disclosure relates to a method of operation of a control device and a control device.

2. Related Art

In JP-A-2013-243515 (Document 1), there is described a display system including a plurality of projectors. This display system superimposes projection images projected by the respective projectors on a projection surface to thereby generate a display image on the projection surface.

In the display system described in Document 1, there is a possibility that the colors of the display image are different from the target colors due to, for example, operation characteristics of the respective projectors. In such a case, it is assumed that each of the projectors adjusts the colors of the projection image using color correction data. Therefore, there is desired a method of generating the color correction data described above.

SUMMARY

A method of operation of a control device according to an aspect of the present disclosure is a method of operation of a control device configured to control a plurality of projectors including the steps of making each of the plurality of projectors projects one or more first images based on first image information to a first area, and generating color correction data used to correct a color of images projected by the plurality of projectors based on imaging data generated by a camera imaging the first area where the first images are projected by the plurality of projectors.

A control device according to an aspect of the present disclosure includes a projection control section configured to make each of a plurality of projectors projects one or more first images based on first image information to a first area, and a generation section configured to generate color correction data used to correct a color of images projected by the plurality of projectors based on imaging data generated by a camera imaging the first area where the first images are projected by the plurality of projectors.

DESCRIPTION OF AN EXEMPLARY EMBODIMENT

A: First Embodiment

A1: Outline of Display System 1000

Figure 1:
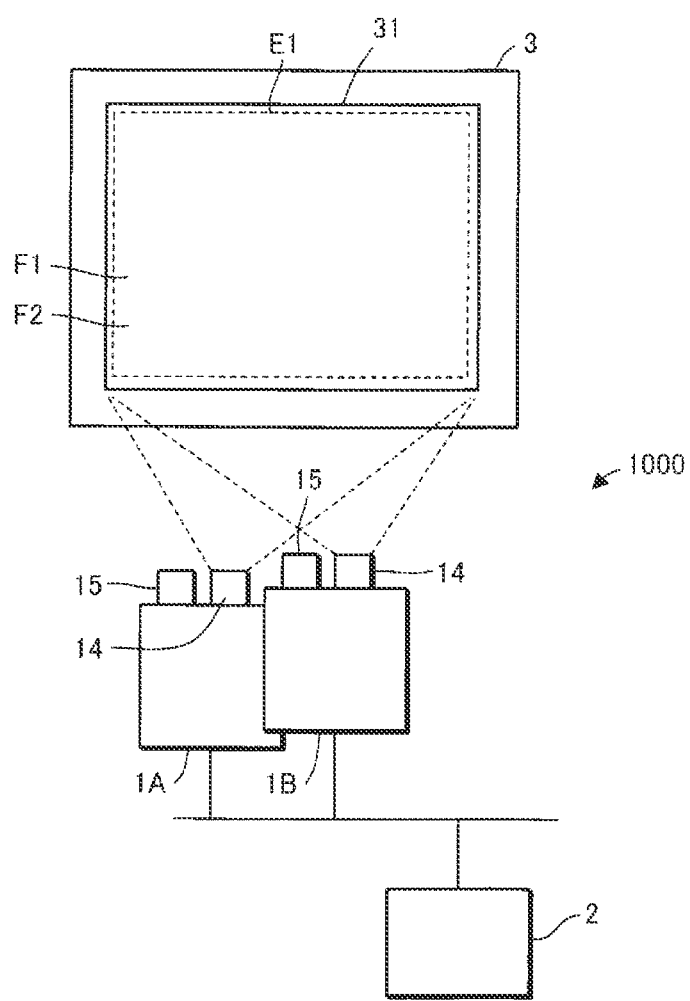
FIG. 1 is a diagram showing an example of a display system.

FIG. 1 is a diagram showing an example of a display system 1000. The display system 1000 includes a first projector 1A, a second projector 1B, and a control device 2.

The first projector 1A through the second projector 1B are an example of a plurality of projectors. The plurality of projectors is not limited to the two projectors. The plurality of projectors can also be three or more projectors.

The first projector 1A and the second projector 1B are the same in configuration as each other. it should be noted that the first projector 1A and the second projector 1B are not required to be the same in configuration as each other. Hereinafter, when there is no need to distinguish the first projector 1A and the second projector 1B from each other, these projectors are referred to as "projectors 1."

The first projector 1A and the second projector 1B generate images based on common image information. The image to be generated by the first projector 1A is hereinafter referred to as a "first projection image F1." The image to be generated by the second projector 1B is referred to as a "second projection image F2." The first projector 1A projects the first projection image F1 in a first area 31 of the display surface 3. The second projector 1B projects the second projection image F2 in the first area 31. The first projection image F1 and the second projection image F2 are superimposed on each other in the first area 31. A composite image E1 is generated using the first projection image F1 and the second projection image F2. The composite image E1 is generated by so-called stack projection.

The display surface 3 is, for example, a screen. The display surface 3 is not limited to the screen, but can also be, for example, a whiteboard, a wall, a ceiling, a floor, or a door.

The first projector 1A corrects the colors of the first projection image F1 based on the color correction data for correcting the colors of the image. The second projector 1B corrects the colors of the second projection image F2 based on the color correction data. The first projector 1A generates one correction image or a plurality of correction images based on first image information for generating the color correction data, and then projects the one correction image or the plurality of correction images in the first area 31. The second projector 1B generates one correction image or a plurality of correction images based on the first image information, and then projects the one correction image or the plurality of correction images in the first area 31. Therefore, one composite correction image or a plurality of composite correction images is generated using the one correction image or the plurality of correction images projected by the first projector 1A and the one correction image or the plurality of correction images projected by the second projector 1B.

The one correction image or the plurality of correction images, and the one composite correction image or the plurality of composite correction images are an example of one first image or a plurality of first images based on the first image information.

Hereinafter, there will be described an example in which the plurality of correction images and the plurality of composite correction images are used.

The first image information represents a red-colored image in eight gray levels from a gray level "0" through a gray level "7," a green-colored image in the eight gray levels from the gray level "0" through the gray level "7," and a blue-colored image in the eight gray levels from the gray level "0" through the gray level "7" as the plurality of correction images. Hereinafter, the red-colored image is referred to as a "red image." The green-colored image is referred to as a "green image." The blue-colored image is referred to as a "blue image." In the correction image, the lower the value of the gray level is, the darker the image is. The red image at the gray level "0," the green image at the gray level "0," and the blue image at the gray level "0" each represent a black image. The gray level "7" is the highest gray level.

It should be noted that the gray level "0" through gray level "7" in the first image information are made to correspond to the gray levels from the lowest gray level to the highest gray level in the projection image information representing the first projection image F1 and the second projection image F2. The projection image information represents an image such as a movie or an image for a presentation.

For example, when the lowest gray scale is "0" and the highest gray level is "255" in the projection image information, the gray level "0" in the first image information corresponds to the lowest gray level "0" in the projection image information, and the gray level "7" in the first image information corresponds to the highest gray level "255" in the projection image information. The number of the gray levels in the first image information is not limited to "8," but can arbitrarily be changed.

The first image information includes red image information representing the red image, green image information representing the green image, blue image information representing the blue image, and black image information representing the black image. The red image information represents the red image in the seven gray levels from the gray level "1" through the gray level "7." The green image information represents the green image in the seven gray levels from the gray level "1" through the gray level "7." The blue image information represents the blue image in the seven gray levels from the gray level "1" through the gray level "7." The black image represented by the black image information is used as the red image at the gray level "0," the green image at the gray level "0," and the blue image at the gray level "0." The red image information, the green image information, the blue image information, and the black image information each include an R signal representing a red color, a G signal representing a green color, and a B signal representing a blue color. The first image information is represented by RGB signals. The first image information is not limited to the RGB signals, but can be image data in the YUV color space represented by Y (a luminance signal), U (a first color-difference signal), and V (a second color-difference signal), image data in the YCbCr color space, or image data in the YPbPr color space. For example, YUV signals or YCbCr signals can also be adopted. When the first image information is different from the RGB signals, the first projector 1A and the second projector 1B convert the first image information into the RGB signals.

The first image information is stored in the first projector 1A and the second projector 1B. The first image information can be supplied to the first projector 1A and the second projector 1B from, for example, the control device 2.

The control device 2 is, for example, a PC (Personal Computer). The control device 2 is not limited to the PC, but can also be, for example, a tablet terminal or a smartphone.

The control device 2 can also be a device to be installed in either one of the first projector 1A and the second projector 1B. In this case, the projector equipped with the control device 2 out of the first projector 1A and the second projector 1B can be referred to as a "master projector."

The control device 2 communicates with each of the first projector 1A and the second projector 1B via, for example, a wired LAN (Local Are Network). Each of a communication format between the control device 2 and the first projector 1A and a communication format between the control device 2 and the second projector 1B is not limited to the wired LAN, but can also be, for example, a wireless LAN or Bluetooth. Bluetooth is a registered trademark. The control device 2 controls the first projector 1A and the second projector 1B.

A2: One Example of Projector 1

Figure 2:
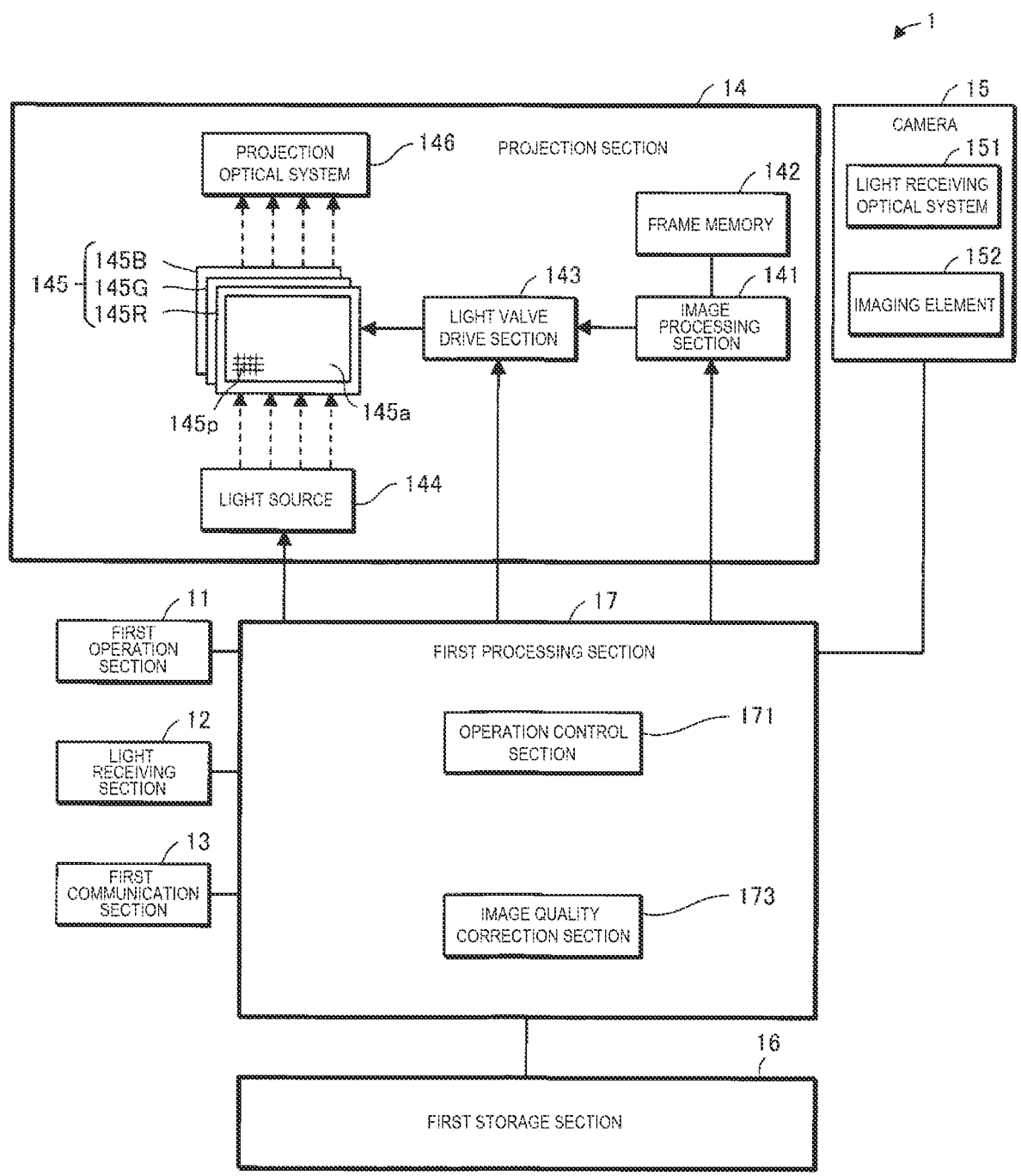
FIG. 2 is a diagram showing an example of a projector.

FIG. 2 is a diagram showing an example of the projector 1. The projector 1 includes a first operation section 11, a light receiving section 12, a first communication section 13, a projection section 14, a camera 15, a first storage section 16, and a first processing section 17.

The first operation section 11 corresponds to, for example, a variety of operating buttons, operating keys, or a touch panel. The first operation section 11 is provided to a chassis of the projector 1. The first operation section 11 receives an input operation by the user.

The light receiving section 12 receives an infrared signal based on the input operation to a remote controller not shown from the remote controller. The remote controller is provided with a variety of operating buttons, operating keys, or a touch panel for receiving the input operation.

The first communication section 13 communicates with the control device 2. The communication format between the first communication section 13 and the control device 2 is the wired LAN as described above. It should be noted that the communication format between the first communication section 13 and the control device 2 is not limited to the wired LAN.

The projection section 14 projects an image on the first area 31 to thereby display the image in the first area 31. The projection section 14 includes an image processing section 141, a frame memory 142, a light valve drive section 143, a light source 144, a red-color liquid crystal light valve 145R, a green-color liquid crystal light valve 145G, a blue-color liquid crystal light valve 145B, and a projection optical system 146. Hereinafter, when there is no need to distinguish the red-color liquid crystal light valve 145R, the green-color liquid crystal light valve 145G, and the blue-color liquid crystal light valve 145B from each other, these are referred to as "liquid crystal light valves 145."

The image processing section 141 is formed of a circuit such as a single image processor or a plurality of image processors. The image processing section 141 receives image information from the first processing section 17. The image information is, for example, the projection image information. The image information can be the first image information.

The image processing section 141 develops the image information on the frame memory 142. The frame memory 142 is formed of a storage device such as a RAM (Random Access Memory). The image processing section 141 performs image processing on the image information having been developed on the frame memory 142 to thereby generate a drive signal.

The image processing executed by the image processing section 141 includes, for example, a color correction process for correcting the colors of the image to be projected by the projection section 14.

The light valve drive section 143 is formed of a circuit such as a driver. The light valve drive section 143 generates drive voltages based on the drive signal provided from the image processing section 141. The light valve drive section 143 applies the drive voltages to the liquid crystal light valves 145 to thereby drive the liquid crystal light valves 145.

The light source 144 is, for example, an LED (light emitting diode). The light source 144 is not limited to the LED, but can also be, for example, a xenon lamp, a super-high pressure mercury lamp, or a laser source. The light source 144 emits the light. The light emitted from the light source 144 enters an integrator optical system not shown. The integrator optical system reduces the unevenness in luminance distribution in the incident light. The light emitted from the light source 144 passes through the integrator optical system, and is then separated by a color separation optical system not shown into colored light components of red, green, and blue as the three primary colors of light. The red-colored light component enters the red-color liquid crystal light valve 145R. The green-colored light component enters the green-color liquid crystal light valve 145G. The blue-colored light component enters the blue-color liquid crystal light valve 145B.

The liquid crystal light valves 145 are each formed of a liquid crystal panel having a liquid crystal material existing between a pair of transparent substrates, and so on. The liquid crystal light valves 145 each have a pixel area 145a having a rectangular shape and including a plurality of pixels 145p arranged in a matrix. In each of the liquid crystal light valves 145, the drive voltage based on the image information is applied to the liquid crystal material for each of the pixels 145p. When the light val drive section 143 applies the drive voltages to the respective pixels 145p, the light transmittance of each of the pixels 145p is set to the light transmittance based on the drive voltage. The light emitted from the light source 144 passes through the pixel area 145a to thereby be modulated. Therefore, the image based on the image information is formed for each colored light. The liquid crystal light valves 145 are an example of a light modulation device.

The images of the respective colors are combined by a color combining optical system not shown for each of the pixels 145p. Therefore, a color image is generated. The color image is projected via the projection optical system 146.

The camera 15 includes a light receiving optical system 151 such as a lens, and an imaging element 152 for converting the light collected by the light receiving optical system 151 into an electric signal. The imaging element 152 is a CCD (Charge Coupled Device) image sensor for receiving the light in, for example, the infrared region and the visible light region. The imaging element 152 is not limited to the CCD image sensor, but can also be a CMOS (Complementary Metal Oxide Semiconductor) image sensor for receiving the light in, for example, the infrared region and the visible light region.

The camera 15 images the first area 31 to thereby generate imaging data. For example, the camera 15 takes the composite correction image displayed in the first area 31 to thereby generate correction image imaging data.

In the present embodiment, the camera 15 of the first projector 1A takes the composite correction image displayed in the first area 31 to thereby generate the correction image imaging data. In this case, in the second projector 1B, the camera 15 can be omitted. It should be noted that it is possible for the camera 15 of the second projector 1B to take the composite correction image displayed in the first area 31 to thereby generate the correction image imaging data. In this case, in the first projector 1A, the camera 15 can be omitted.

The camera 15 can be disposed as a separate member from the projector 1. In this case, the camera 15 and the projector 1 are coupled to each other with a wired or wireless interface so as to be able to perform transmission/reception of data.

The first storage section 16 is a recording medium which can be read by the first processing section 17. The first storage section 16 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM.

The first storage section 16 stores a program to be executed by the first processing section 17, and a variety of types of data to be used by the first processing section 17.

The first processing section 17 is formed of, for example, a single processor, or a plurality of processors. Citing an example, the first processing section 17 is formed of a signal CPU (Central Processing Unit) or a plurality of CPUs. Some or all of the functions of the first processing section 17 can also be realized by a circuit such as a DSP (Digital Signal Processor), an ASIC (Application Specific Integrated Circuit), a PLD (Programmable Logic Device), or an FPGA (Field Programmable Gate Array). The first processing section 17 executes a variety of types of processing in parallel or in sequence. The first processing section 17 retrieves the program from the first storage section 16. The first processing section 17 executes the program to thereby realize an operation control section 171 and an image quality correction section 173.

The operation control section 171 controls a variety of operations of the projector 1. For example, the operation control section 171 controls the first communication section 13, the projection section 14, and the camera 15. Citing an example, the operation control section 171 makes the projection section 14 project the image. The operation control section 171 makes the camera 15 perform imaging. The operation control section 171 makes the first communication section 13 transmit the imaging data to the control device 2. The operation control section 171 controls the calibration operation described later. It should be noted that the operation control section 171 can be formed of a circuit such as a single operation controller or a plurality of operation controllers.

The image quality correction section 173 corrects the image quality of the image to be projected from the projection section 14. The image quality correction section 173 corrects the colors of the projection image represented by the projection image information from the colors represented by the projection image information on which the correction has not been performed into the colors represented by the projection image information on which the correction has been performed by, for example, making the image processing section 141 correct the projection image information based on the color correction data. It should be noted that the image quality correction section 173 can be formed of a circuit such as a single image quality compensator or a plurality of image quality compensators.

A3: One Example of Control Device 2

Figure 3:
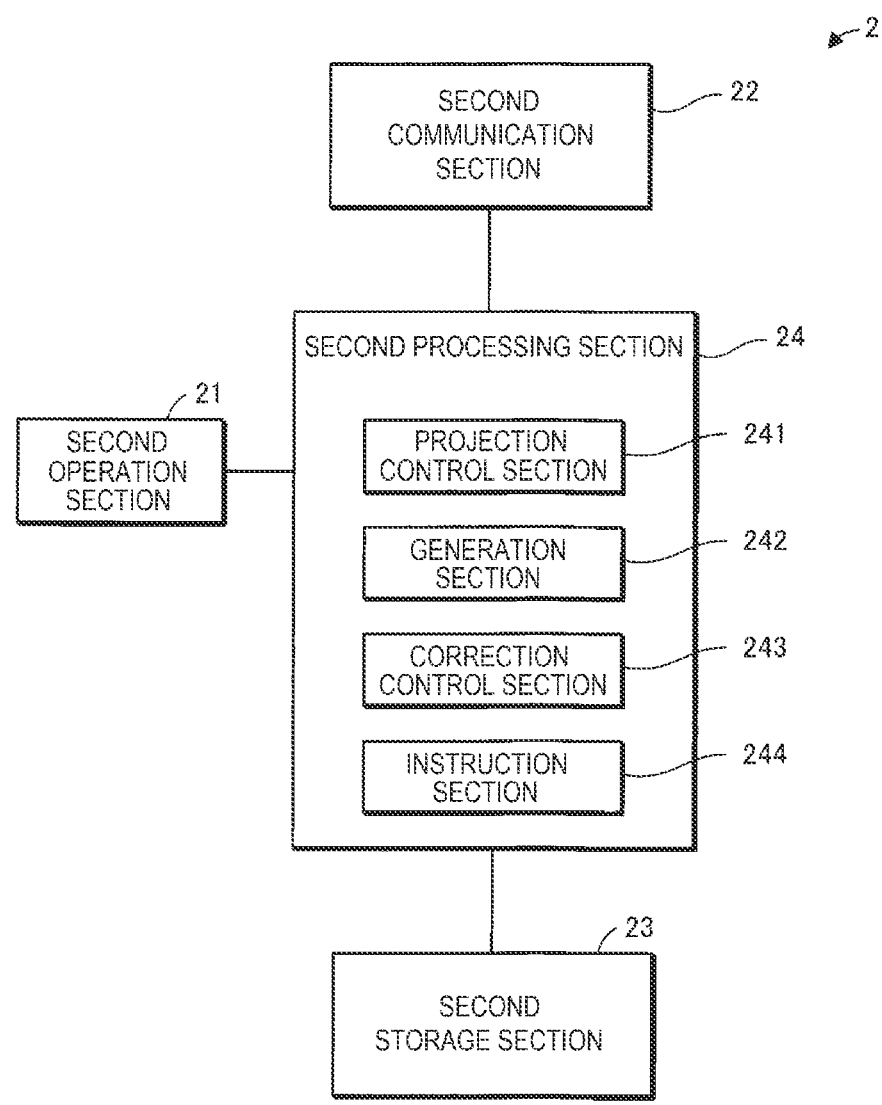
FIG. 3 is a diagram showing an example of a control device.

FIG. 3 is a diagram showing an example of the control device 2. The control device 2 includes a second operation section 21, a second communication section 22, a second storage section 23, and a second processing section 24.

The second operation section 21 corresponds to, for example, a keyboard, operating buttons, or a touch panel. The second operation section 21 receives an input operation by the user.

The second communication section 22 communicates with each of the first projector 1A and the second projector 1B. Specifically, the second communication section 22 communicates with the first communication section 13 via the wired LAN. The communication format between the second communication section 22 and the first communication section 13 is not limited to the wired LAN. The second communication section 22 receives, for example, the correction image imaging data.

The second storage section 23 is a recording medium which can be read by the second processing section 24. The second storage section 23 includes, for example, a nonvolatile memory and a volatile memory. The second storage section 23 stores a program to be executed by the second processing section 24, and a variety of types of data to be used by the second processing section 24.

The second processing section 24 is formed of, for example, a single processor or a plurality of processors. Citing an example, the second processing section 24 is formed of a signal CPU or a plurality of CPUs. Some or all of the functions of the second processing section 24 can be realized by a circuit such as a DSP, an ASIC, a PLD, or an FPGA. The second processing section 24 executes a variety of types of processing in parallel or in sequence. The second processing section 24 retrieves the program from the second storage section 23. The second processing section 24 executes the program retrieved from the second storage section 23 to thereby realize a projection control section 241, a generation section 242, a correction control section 243, and an instruction section 244.

The projection control section 241 controls the projection executed by the first projector 1A and the projection executed by the second projector 13. For example, the projection control section 241 makes the first projector 1A and the second projector 1B project the image based on the first image information to the first area 31. The projection control section 241 can be formed of a circuit such as a single projection controller or a plurality of projection controllers.

The generation section 242 generates the color correction data. For example, when the generation section 242 receives the correction image imaging data from the first projector 1A via the second communication section 22, the generation section 242 generates the color correction data based on the correction image imaging data. The generation section 242 can be formed of a circuit such as a single color correction data generator or a plurality of color correction data generators.

The correction control section 243 makes the first projector 1A and the second projector 1B execute the correction using the color correction data. For example, the correction control section 243 provides each of the first projector 1A and the second projector 1B with the color correction data from the second communication section 22 to thereby make the first projector 1A and the second projector 1B execute the correction using the color correction data. The correction control section 243 can be formed of a circuit such as a single correction controller or a plurality of correction controllers.

The instruction section 244 transmits an instruction to the first projector 1A. Citing an example, the instruction section 244 transmits an instruction of executing a calibration operation of associating an imaging coordinate in the imaging data generated by the camera 15 and a panel coordinate in the liquid crystal light valves 145 with each other to the first projector 1A via the second communication section 22. The instruction section 244 can be formed of, for example, an instruction circuit.

A4: Calibration Operation

Figure 4:
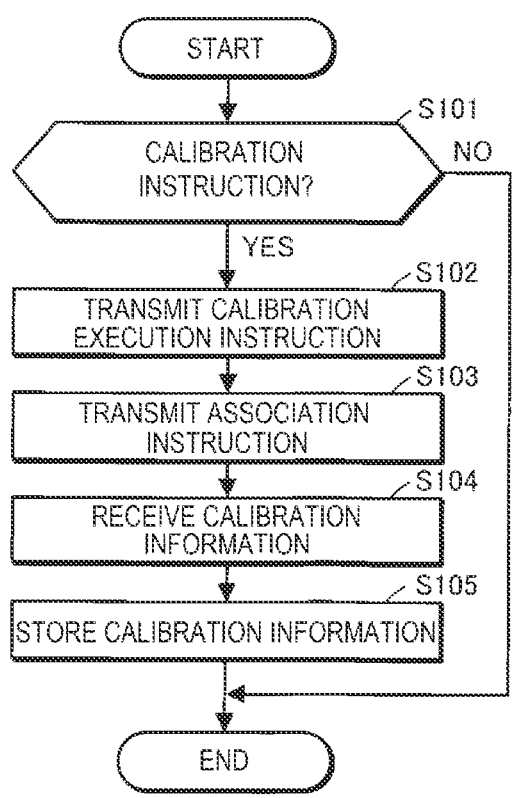
FIG. 4 is a flowchart for explaining a calibration operation.

FIG. 4 is a flowchart for explaining the calibration operation. When the second operation section 21 of the control device 2 receives a calibration execution instruction for executing the calibration operation in the step S101, the instruction section 244 transmits the calibration execution instruction from the second communication section 22 to the first projector 1A in the step S102.

In the first projector 1A, when the first communication section 13 receives the calibration execution instruction, the operation control section 171 makes the projection section 14 project a calibration pattern image to the first area 31. The calibration pattern image is, for example, a grid pattern. On the four corners of the calibration pattern image, there are formed predetermined marks. The predetermined marks are used for detecting the four corners of the calibration pattern image. When the first storage section 16 stores pattern image information representing the calibration pattern image, the operation control section 171 retrieves the pattern image information from the first storage section 16. The operation control section 171 outputs the pattern image information to the image processing section 141 to thereby make the projection section 14 project the calibration pattern image to the first area 31.

After transmitting the calibration execution instruction, the instruction section 244 transmits in the step S103 an association instruction from the second communication section 22 to the first projector 1A.

In the first projector 1A, when the first communication section 13 receives the association instruction, the operation control section 171 makes the camera 15 execute imaging. The camera 15 executes imaging to thereby generate the imaging data representing the calibration pattern image. The operation control section 171 associates the imaging coordinate in the imaging data and the panel coordinate in the liquid crystal light valves 145 with each other. Specifically, the operation control section 171 firstly detects a mark in the calibration pattern image represented by the imaging data. Subsequently, the operation control section 171 identifies the position of the pixel representing the mark in the calibration pattern image in the imaging data. Subsequently, the operation control section 171 identifies the position of the pixel representing the mark in the calibration pattern image in the liquid crystal light valves 145. Subsequently, the operation control section 171 generates calibration information in which the position of the pixel representing the mark in the calibration pattern image in the imaging data and the position of the pixel representing the mark in the calibration pattern image in the liquid crystal light valves 145 are associated with each other. Therefore, the imaging coordinate and the panel coordinate are associated with each other. The calibration information can also be referred to as coordinate conversion information.

The position of the pixel representing the mark in the liquid crystal light valves 145 can be stored in, for example, the first storage section 16 in advance. In this case, it is also possible for the operation control section 171 to obtain the position of the pixel representing the mark in the liquid crystal light valves 145 from the first storage section 16.

Further, it is also possible for the operation control section 171 to identify the position of the pixel representing the mark in the liquid crystal light valves 145 based on the position of the pixel representing the mark in the frame memory 142 when the image processing section 141 develops the calibration pattern image in the frame memory 142. In this case, the first storage section 16 stores, in advance, position association information for associating the position of the pixel in the frame memory 142 and the position of the pixel in the liquid crystal light valves 145 with each other. The operation control section 171 uses the position association information to thereby identify the position of the pixel representing the mark in the liquid crystal light valves 145 based on the position of the pixel representing the mark in the frame memory 142.

Subsequently, the operation control section 171 transmits the calibration information from the first communication section 13 to the control device 2.

When the second communication section 22 receives in the step S104 the calibration information from the first projector 1A, the instruction section 244 stores in the step S105 the calibration information in the second storage section 23.

A5: Operation of Generating Color Correction Data

Figure 5:
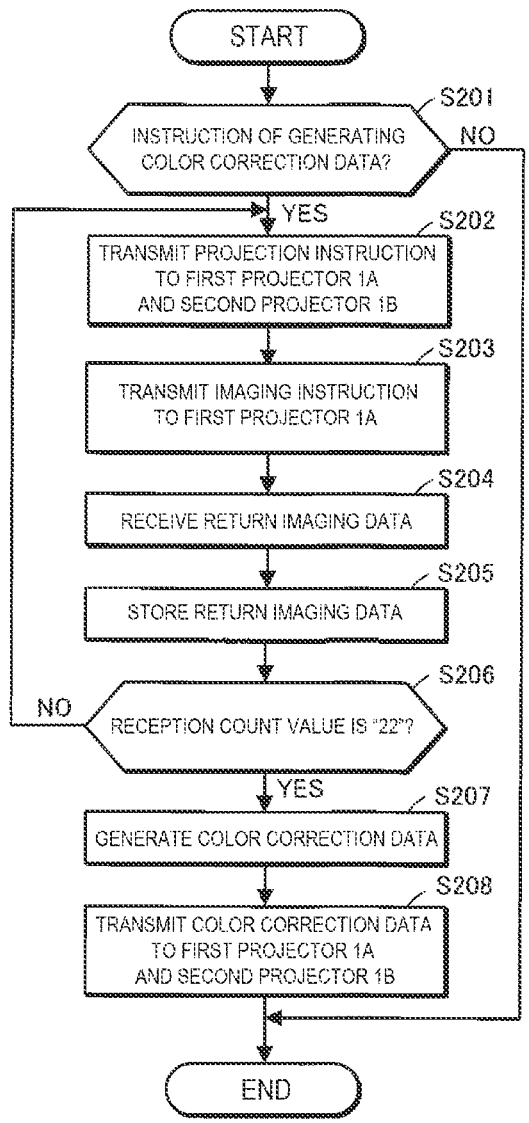
FIG. 5 is a diagram for explaining an operation of generating color correction data.

FIG. 5 is a diagram for explaining an operation of generating the color correction data. When the second operation section 21 of the control device 2 receives in the step S201 an instruction of generating the color correction data, the projection control section 241 transmits in the step S202 a projection instruction of projecting a nonselected correction image out of the plurality of correction images represented by the first image information from the second communication section 22 to the first projector 1A and the second projector 1B.

In the first projector 1A and the second projector 1B, when the first communication section 13 has received the projection instruction, the image quality correction section 173 counts the umber of times of reception of the projection instruction. The count value of the number of times of reception of the projection instruction is hereinafter referred to as a "reception count value." An initial value of the reception count value is "0." The reception count value increases by "1" every time the projection instruction is received.

In the present embodiment, the reception count values "1" through "7" are made to correspond to the red images at the gray level "1" through the gray level "7," respectively. The reception count values "8" through "14" are made to correspond to the green images at the gray level "1" through the gray level "7," respectively. The reception count values "15" through "21" are made to correspond to the blue images at the gray level "1" through the gray level "7," respectively. The reception count value "22" is made to correspond to the black image.

The correspondence relationship between the reception count value and the images is represented by correspondence information. The correspondence information is stored in the first storage section 16 of the first projector 1A, the first storage section 16 of the second projector 1B, and the second storage section 23 of the control device 23.

Subsequently, in the first projector 1A and the second projector 1B, the image quality correction section 173 identifies the correction image made to correspond to the reception count value as a projection target image from the plurality of correction images represented by the first image information. For example, when the reception count value is "1," the image quality correction section 173 identifies the red image at the gray level "1" as the projection target image.

Subsequently, in the first projector 1A and the second projector 1B, the image quality correction section 173 retrieves the image information representing the projection target image as projection target image information from the first image information stored in the first storage section 16. For example, when the projection target image is the red image at the gray level "1," the image quality correction section 173 retrieves the image information representing the red image at the gray level "1" as the projection target image information from the first image information.

Subsequently, in the first projector 1A and the second projector 1B, the image quality correction section 173 outputs the projection target image information to the image processing section 141 to thereby make the projection section 14 project the projection target image to the first area 31. For example, when the projection target image information is image information representing the red image at the gray level "1," the image quality correction section 173 makes the projection section 14 project the red image at the gray level "1" to the first area 31. Therefore, in the first area 31, the projection target image projected by the first projector 1A and the projection target image projected by the second projector 1B are superimposed on each other. Therefore, the composite correction image is displayed in the first area 31.

After transmitting the projection instruction, the projection control section 214 transmits in the step S203 an imaging instruction from the second communication section 22 to the first projector 1A.

In the first projector 1A, when the first communication section 13 receives the imaging instruction, the image quality correction section 173 makes the camera 15 execute imaging. The camera 15 executes imaging to thereby generate the imaging data representing the composite correction image displayed in the first area 31. The image quality correction section 173 adds the reception count value to the imaging data representing the composite correction image to thereby generate return imaging data. The image quality correction section 173 transmits the return imaging data from the first communication section 13 to the control device 2. It should be noted that when the image quality correction section 173 transmits the return imaging data in which the reception count value is "22" from the first communication section 13 to the control device 2, the image quality correction section 173 resets the reception count value to "0."

When the second communication section 22 receives in the step S204 the return imaging data from the first projector 1A, the projection control section 241 stores in the step S205 the return imaging data in the second storage section 23.

Subsequently, the projection control section 241 determines in the step S206 whether or not the reception count value represented by the latest return imaging data is "22" as the number of the correction images represented by the first image information. In other words, the determination in the step S206 means the determination on whether or not the imaging data has been obtained with respect to all of the 22 correction images represented by the first image information.

When the reception count value represented by the latest return imaging data is not "22," the process returns to the step S202.

When the reception count value represented by the latest return imaging data is "22," the generation section 242 generates the color correction data in the step S207. An example of the generation of the color correction data will be described later.

Subsequently, in the step S208, the correction control section 243 transmits the color correction data from the second communication section 22 to the first projector 1A and the second projector 1B. Subsequently, the correction control section 243 deletes the return imaging data from the second storage section 23.

In the first projector 1A and the second projector 1B, when the first communication section 13 has received the color correction data, the image quality correction section 173 stores the color correction data in the first storage section 16.

The image quality correction section 173 corrects the colors of the projection image from the colors represented by the projection image information on which the correction has not been performed into the colors represented by the projection image information on which the correction has been performed by making the image processing section 141 correct the projection image information based on the color correction data.

A6: Example of Generation of Color Correction Data

Then, an example of generation of the color correction data will be described. The generation section 242 identifies a pixel area representing the composite correction image from the return imaging data for each of the return imaging data using the calibration information of the first projector 1A.

Subsequently, the generation section 242 detects the pixel values in the identified area, specifically, the RGB values in the identified area, in the composite correction image for each of the return imaging data. The identified area in the composite correction image is, for example, an area of 20×20 pixels including the center of the composite correction image. The identified area in the composite correction image is not limited to that area, but can arbitrarily be changed.

Subsequently, the generation section 242 calculates average values of the RGB values in the identified area for each of the return imaging data. The average values of the RGB values are represented by an average value of the R value, an average value of the G value, and an average value of the B value.

Subsequently, the generation section 242 converts the average values of the RGB values in the identified area into values in the XYZ display system, specifically, the XYZ values. For example, the generation section 242 converts the average values of the RGB values in the identified area into the XYZ values using the conversion equation shown in Formula 1.

$$\begin{pmatrix} X_{R(n)} & X_{G(n)} & X_{B(n)} \\ Y_{R(n)} & Y_{G(n)} & Y_{B(n)} \\ Z_{R(n)} & Z_{R(n)} & Z_{R(n)} \end{pmatrix} = M * \begin{pmatrix} R_{R(n)} & R_{G(n)} & R_{B(n)} \\ G_{R(n)} & G_{G(n)} & G_{B(n)} \\ B_{R(n)} & B_{R(n)} & B_{R(n)} \end{pmatrix} \quad \text{Formula 1}$$

$$M = \begin{pmatrix} S_0 & S_3 & S_6 \\ S_1 & S_4 & S_7 \\ S_2 & S_5 & S_8 \end{pmatrix}$$

Here, $R_{R(n)}$, $G_{R(n)}$, and $B_{R(n)}$ represent the RGB values in the imaging data of the red image at the gray level "n." $R_{G(n)}$, $G_{G(n)}$, and $B_{G(n)}$ represent the RGB values in the imaging data of the green image at the gray level "n." $R_{B(n)}$, $G_{B(n)}$, and $B_{B(n)}$ represent the RGB values in the imaging data of the blue image at the gray level "n." $X_{R(n)}$, $Y_{R(n)}$, and $Z_{R(n)}$ are values obtained by converting $R_{R(n)}$, $G_{R(n)}$, and $B_{R(n)}$ into the XYZ values. $X_{G(n)}$, $Y_{G(n)}$, and $Z_{G(n)}$ are values obtained by converting $R_{G(n)}$, $G_{G(n)}$, and $B_{G(n)}$ into the XYZ values. $X_{B(n)}$, $Y_{R(n)}$ and $Z_{B(n)}$ are values obtained by converting $R_{B(n)}$, $G_{B(n)}$, and $B_{B(n)}$ into the XYZ values. The conversion matrix M in Formula 1 is stored in, for example, the second storage section 23. The conversion matrix M can be calculated in advance using general calculation. The conversion matrix M can be calculated from a result of the measurement of the optical characteristics of the individual projector 1 in the manufacturing process of the first projector 1A and the second projector 1B.

Figure 6:
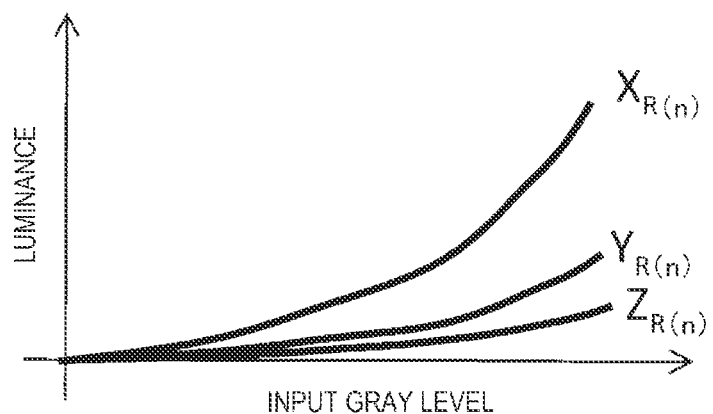
FIG. 6 is a diagram showing an example of gray level-luminance characteristics of a red image.
Figure 7:
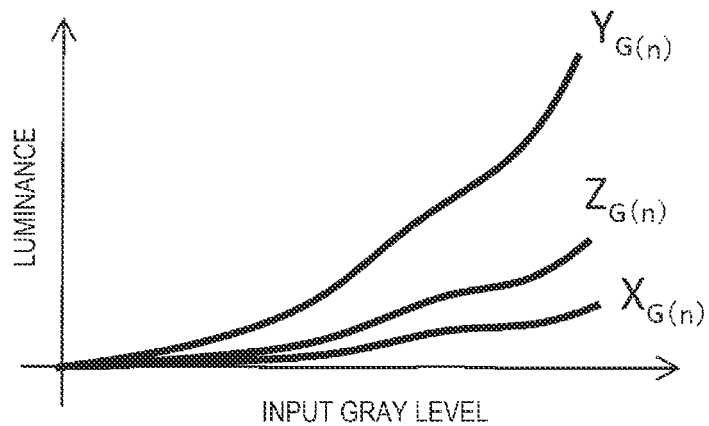
FIG. 7 is a diagram showing an example of gray level-luminance characteristics of a green image.
Figure 8:
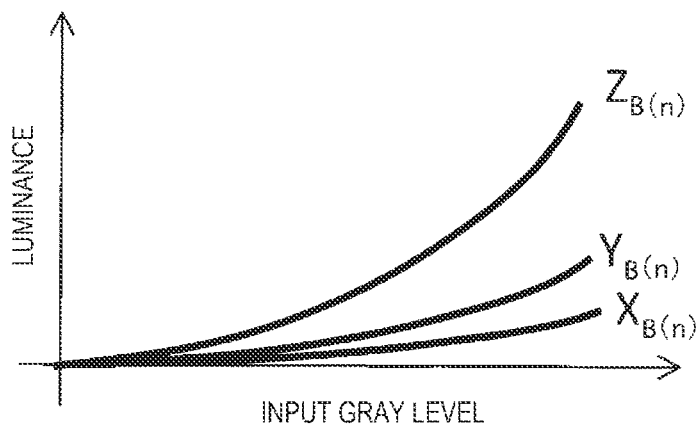
FIG. 8 is a diagram showing an example of gray level-luminance characteristics of a blue image.

Subsequently, the generation section 242 estimates the gray level-luminance characteristics of the red image using $X_{R(n)}$, $Y_{R(n)}$, and $Z_{R(n)}$. FIG. 6 is a diagram showing an example of the gray level-luminance characteristics of the red image. The generation section 242 estimates the gray level-luminance characteristics of the green image using $X_{G(n)}$, $Y_{G(n)}$, and $Z_{G(n)}$. FIG. 7 is a diagram showing an example of the gray level-luminance characteristics of the green image. The generation section 242 estimates the gray level-luminance characteristics of the blue image using $X_{B(n)}$, $Y_{B(n)}$, and $Z_{B(n)}$. FIG. 8 is a diagram showing an example of the gray level-luminance characteristics of the blue image.

Figure 9:
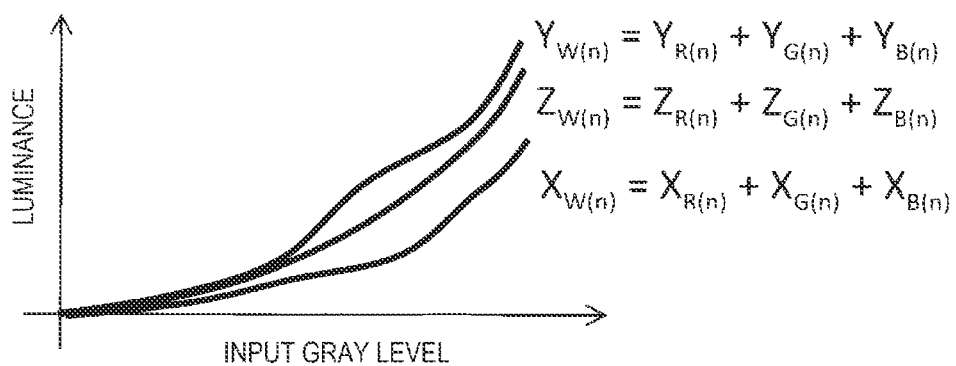
FIG. 9 is a diagram showing an example of white balance characteristics in a white image.

Subsequently, the generation section 242 estimates white balance characteristics in a white image generated by combining the red image, the green image, and the blue image with each other using $X_{R(n)}$, $Y_{R(n)}$, $Z_{R(n)}$, $X_{G(n)}$, $Y_{G(n)}$, $Z_{G(n)}$, $X_{B(n)}$, $Y_{B(n)}$, and $Z_{B(n)}$. FIG. 9 is a diagram showing an example of the white balance characteristics in the white image. $X_{W(n)}$ is identified by a formula of $X_{W(n)}=X_{R(n)}+X_{G(n)}+X_{B(n)}$. $Y_{W(n)}$ is identified by a formula of $Y_{W(n)}=Y_{R(n)}+Y_{G(n)}+Y_{B(n)}$. $Z_{W(n)}$ is identified by a formula of $Z_{W(n)}=Z_{R(n)}+Z_{G(n)}+Z_{B(n)}$.

Figure 10:
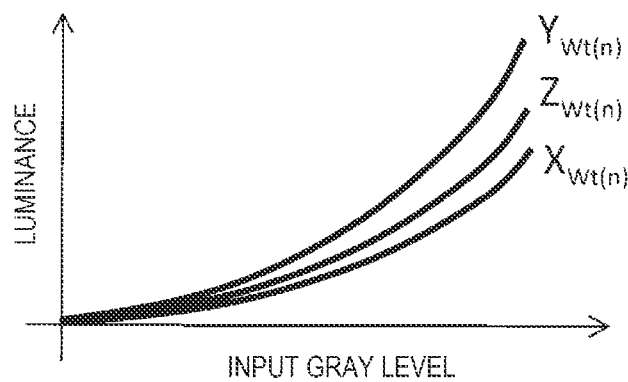
FIG. 10 is a diagram showing an example of target values.

Subsequently, the generation section 242 calculates the color correction data for approximating the white balance characteristics to target values. FIG. 10 is a diagram showing an example of the target values. The target values shown in FIG. 10 are fixed values, specifically, values identified by the white balance characteristics determined in advance.

For example, the generation section 242 generates the color correction data for correcting the XYZ values shown in FIG. 9 so that the XYZ values shown in FIG. 9 coincide with the XYZ values as the target values shown in FIG. 10 at each of the gray levels.

Citing an example, the $X_{W(M)}$ value in the gray level "M" in the white balance characteristics shown in FIG. 9 is denoted by Xa, and the $X_{Wt(M)}$ value at the gray level "M" in the white balance characteristics of the target values shown in FIG. 10 is denoted by Xb. Here, the gray level "M" is one of the eight gray levels of gray level "0" through the gray level "7." Further, in FIG. 9, the gray level at which the $X_W$ value becomes Xb is represented by "N." In this case, the generation section 242 calculates the difference "M−N" between the gray level "M" and the gray level "N" as the color correction data in the X value at the gray level "M."

The generation section 242 similarly calculates the color correction data with respect to the Y value at the gray level "M" and the Z value at the gray level "M."

Further, the generation section 242 calculates the color correction data in the X value, the Y value, and the Z value in substantially the same manner with respect to all of the gray levels other than the gray level "M" out of the gray level "0" through the gray level "7."

Further, the generation section 242 calculates the color correction data at the gray level other than the gray levels at which the color correction data is calculated, for example, the gray level "1.5" by an interpolation calculation using the color correction data thus calculated.

Further, the generation section 242 coincides the range of the gray levels of the color correction data with the range of the gray levels in the projection image information. For example, when the lowest gray level is "0" and the highest gray level is "255" in the projection image information, the generation section 242 changes the range of the gray levels of the color correction data from the range of "0" through "7" to the range of "0" through "255."

A7: Example of Color Correction

Then, an example of the color correction in the projector 1 will be described. The image quality correction section 173 outputs the projection image information as the RGB signals representing, for example, a movie to the image processing section 141. Here, the projection image information represents the gray levels of RGB. Subsequently, the image quality correction section 173 makes the image processing section 141 convert the projection image information as the RGB signals into the XYZ signals. Subsequently, the image quality correction section 173 makes the image processing section 141 correct the XYZ signals thus converted with the color correction data.

On this occasion, the image processing section 141 first identifies the gray levels of the XYZ included in the XYZ signals thus converted. Subsequently, the image processing section 141 subtracts the color correction data corresponding to the gray level of the X value in the XYZ signals having been converted from that X value to thereby generate the X value having been converted. Subsequently, the image processing section 141 subtracts the color correction data corresponding to the gray level of the Y value in the XYZ signals having been converted from that Y value to thereby generate the Y value having been converted. Subsequently, the image processing section 141 subtracts the color correction data corresponding to the gray level of the Z value in the XYZ signals having been converted from that Z value to thereby generate the Z value having been converted. Subsequently, the image processing section 141 converts corrected XYZ signals constituted by the X value having been corrected, the Y value having been corrected, and the Z value having been corrected into the RGB signals. Subsequently, the image processing section 141 generates the drive signal based on the RGB signals having been converted. Therefore, the colors of the projection image represented by the projection image information are corrected from the colors represented by the projection image information having not been corrected into the colors represented by the projection image information having been corrected.

A8: Conclusion of First Embodiment

The operation method and the control device 2 according to the present disclosure described above include the following aspects.

The projection control section 241 makes each of the first projector 1A and the second projector 1B project the plurality of first images based on the first image information to the first area 31. The generation section 242 generates the color correction data based on the imaging data generated by the camera 15 imaging the first area 31 where the first image is projected from each of the first projector 1A and the second projector 1B.

According to this aspect, the number of the imaging data can be made smaller compared to the configuration in which the cameras 15 take the plurality of first images based on the first image information by the first projector 1A and the plurality of first images based on the first image information by the second projector 1B separately from each other to generate the imaging data, and then generates the color correction data based on the imaging data. Therefore, it is possible to shorten the time necessary to generate the color correction data. Therefore, it is possible to provide a method of generating the color correction data without taking a long period of time.

The first image information includes red image information representing a red-colored image, green image information representing a green-colored image, and blue image information representing a blue-colored image. The plurality of first images includes the red image based on the red image information, the green image based on the green image information, and the blue image based on the blue image information. The projection control section 241 makes each of the first projector 1A and the second projector 1B project the red image, the green image, and the blue image to the first area 31 at respective timings different from each other. The generation section 242 receives red image imaging data generated by the camera 15 imaging the first area 31 where the red image is projected from each of the first projector 1A and the second projector 1B. The generation section 242 receives green image imaging data generated by the camera 15 imaging the first area 31 where the green image is projected from each of the first projector 1A and the second projector 1B. The generation section 242 receives blue image imaging data generated by the camera 15 imaging the first area 31 where the blue image is projected from each of the first projector 1A and the second projector 1B. The generation section 242 generates the color correction data based on the red image imaging data, the green image imaging data, and the blue image imaging data.

According to this aspect, since the red image, the green image, and the blue image corresponding to the three primary colors of light are used, it is possible to generate the color correction data with respect to colors different from red, green, and blue.

The generation section 242 calculates a total value of the value of the color represented by the red image imaging data, the value of the color represented by the green image imaging data, and the value of the color represented by the blue image imaging data, and then generates the color correction data based on the relationship between the total value and the target value. According to this aspect, it is possible to generate the color correction data using the target value.

When the target value is a fixed value, for example, it becomes unnecessary to reset the target value every time the color correction data is generated.

The correction control section 243 provides the first projector 1A and the second projector 1B with the color correction data. According to this aspect, it is possible for the first projector 1A and the second projector 1B to correct the colors of the projection image using the color correction data.

B: Modified Examples

Some aspects of the modifications of the embodiment hereinabove illustrated will hereinafter be illustrated. It is also possible to arbitrarily combine two or more aspects arbitrarily selected from the following illustrations with each other within a range in which the aspects do not conflict with each other.

B1: First Modified Example

Figure 11:
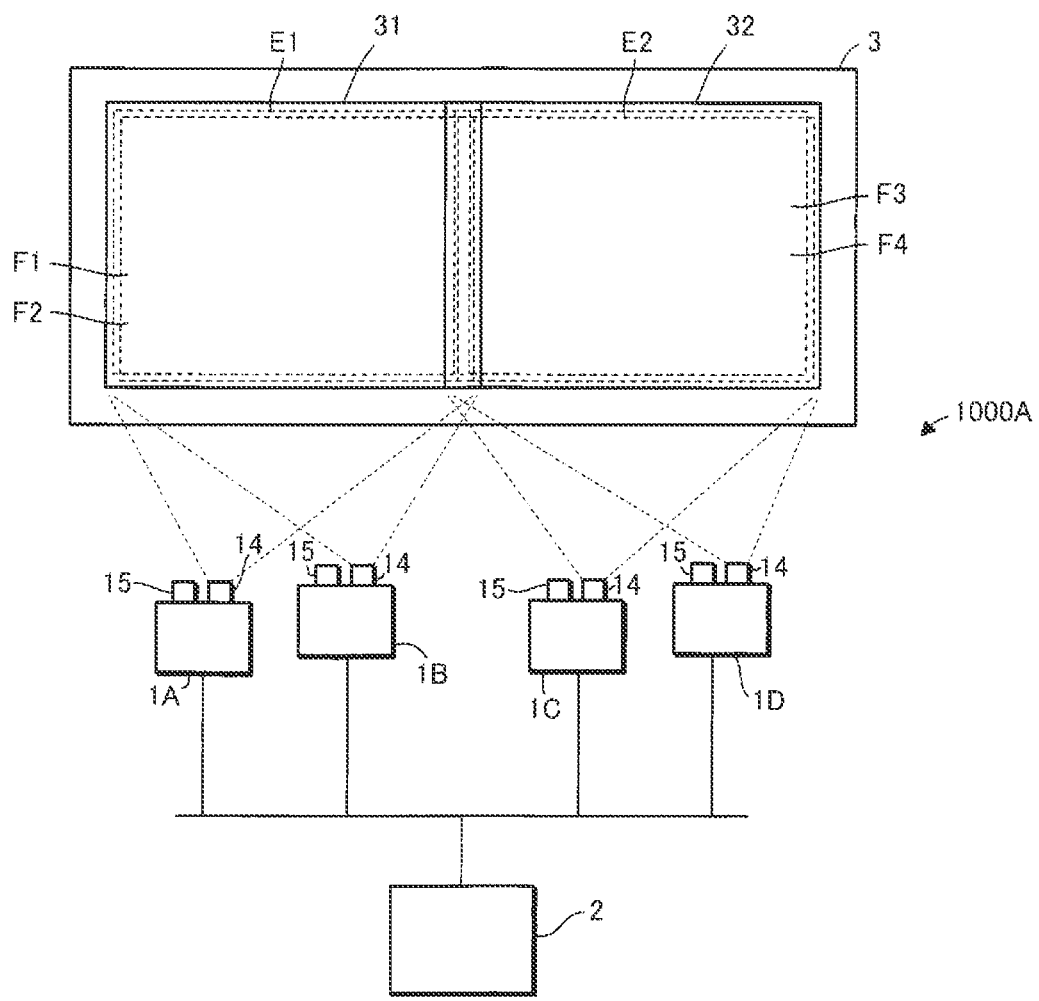
FIG. 11 is a diagram showing an example of a display system.

In the first embodiment, it is possible to add a third projector 1C and a fourth projector 1D. FIG. 11 is a diagram showing an example of a display system 1000A in which the third projector 1C and the fourth projector 1D are added to the first embodiment. The display system 1000A includes the first projector 1A, the second projector 1B, the third projector 10, the fourth projector 1D, and the control device 2. The third projector 10 through the fourth projector 1D are an example of a plurality of projectors different from the first projector 1A through the second projector 1B. The plurality of projectors different from the first projector 1A through the second projector 1B is not limited to the two projectors. The plurality of projectors different from the first projector 1A through the second projector 1B can be three or more projectors.

The first projector 1A through the fourth projector 1D are the same in configuration as each other. The first projector 1A through the fourth projector 1D are not required to be the same in configuration as each other.

The third projector 1C and the fourth projector 1D generate images based on common image information. The image to be generated by the third projector 10 is hereinafter referred to as a "third projection image F3." The image to be generated by the fourth projector 1D is referred to as a "fourth projection image F4." The third projector 10 projects the third projection image F3 in a second area 32 of the display surface 3. The fourth projector 1D projects the fourth projection image F4 in the second area 32. The third projection image F3 and the fourth projection image F4 are superimposed on each other in the second area 32. A composite image E2 is generated using the third projection image F3 and the fourth projection image F4. The composite image E2 is generated by so-called stack projection. The second area 32 is located at a different position from the first area 31. A part of the second area 32 overlaps a part of the first area 31. Therefore, a part of the composite image E1 overlaps a part of the composite image E2.

On the part overlapping the third projection image F3 in the first projection image F1, there is performed a so-called edge blending process. The edge blending process means a process of performing a dimming process in an overlapping area overlapping another projection image in the projection image to thereby reduce a difference in brightness between the overlapping area and a non-overlapping area.

The edge blending process is also performed on a part overlapping the fourth projection image F4 in the second projection image F2, a part overlapping the first projection image F1 in the third projection image F3, and a part overlapping the second projection image F2 in the fourth projection image F4.

It should be noted that a part of the first area 31 is not required to overlap a part of the second area 32. In this case, the edge blending process is not performed in the first projection image F1 through the fourth projection image F4.

The control device 2 generates the color correction data to be used for the first projector 1A and the second projector 1B and the color correction data to be used for the third projector 1C and the fourth projector 1D separately from each other.

Figure 12:
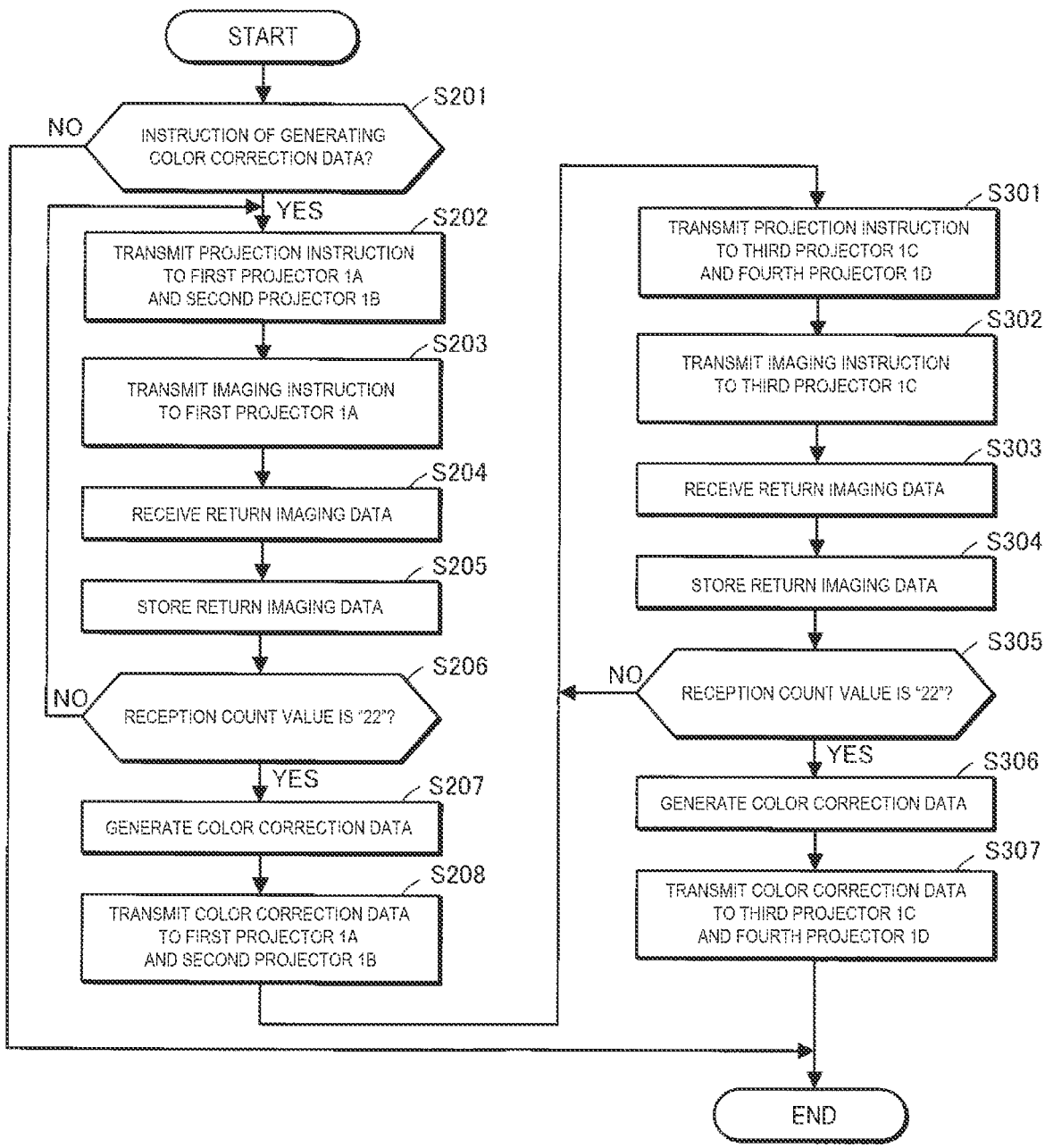
FIG. 12 is a flowchart for explaining an operation of the control device in the display system.

FIG. 12 is a flowchart for explaining an operation of the control device 2 in the display system 1000A. It should be noted that in FIG. 12, the same processes as those shown in FIG. 5 are denoted by the same reference symbols. Hereinafter, the description will be presented with a focus on different processes from the processes shown in FIG. 5.

When the step S208 terminates, the projection control section 241 performs the step S301. The step S301 is different from the step S202 in the point that the transmission destination of the projection instruction is the third projector 1C and the fourth projector 1D instead of the first projector 1A and the second projector 1B.

Subsequently, the projection control section 241 executes the step S302. The step S302 is different from the step S203 in the point that the transmission destination of the imaging instruction is the third projector 1C instead of the first projector 1A.

Subsequently, the projection control section 241 executes the step S303. The step S303 is different from the step S204 in the point that the transmission source of the return imaging data is the third projector 10 instead of the first projector 1A.

Subsequently, the projection control section 241 executes the step S304. The step S304 is the same in process as the step S205.

Subsequently, the projection control section 241 executes the step S305. The determination content in the step S305 is the same as the determination content in the step S206. It should be noted that when the reception count value represented by the latest return imaging data is not "22" in the step S305, the process returns to the step S301.

When the reception count value represented by the latest return imaging data is "22" in the step S305, the generation section 242 generates the color correction data for the third projector 10 and the fourth projector 1D in the step S306. The method of generating the color correction data for the third projector 1C and the fourth projector 1D is substantially the same as the method of generating the color correction data for the first projector 1A and the second projector 1B, specifically, the generation method in the step S207.

Subsequently, in the step S307, the correction control section 243 transmits the color correction data generated in the step S306 from the second communication section 22 to the third projector 1C and the fourth projector 1D. Subsequently, the correction control section 243 deletes the return imaging data from the second storage section 23.

In the first modified example, when the first projector 1A and the second projector 1B project a plurality of correction images, neither the third projector 1C nor the fourth projector 1D projects the correction image. Therefore, it is possible to generate the color correction data used in the first projector 1A and the second projector 1B without being affected by an unwanted correction image uninvolved in the color correction data, specifically, the correction image projected by each of the third projector 1C and the fourth projector 1D.

It should be noted that the target value used when generating the color correction data to be used in the third projector 1C and the fourth projector 1D can be different from the target value used when generating the color correction data to be used in the first projector 1A and the second projector 1B.

For example, the target value used when generating the color correction data to be used in the third projector 1C and the fourth projector 1D can be a value represented by the white balance characteristics of the composite image E1 generated using the white projection images corrected by the first projector 1A and the second projector 1B using the color correction data.

On this occasion, the generation section 242 determines the white balance characteristics to be the target based on the imaging data generated by the camera 15 taking the composite image E1 of the white color at the gray level "0" through the gray level "7" having been corrected.

In this case, the third projector 1C and the fourth projector 1D become an example of the plurality of projectors. The first projector 1A and the second projector 1B become an example of the plurality of projectors different from the third projector 1C through the fourth projector 1D. The first area 31 becomes an example of the second area. The second area 32 becomes an example of the first area. The composite image E1 of the white color at the gray level "0" through the gray level "7" on which the color correction has been performed becomes an example of the second image. The generation section 242 identifies the values of the colors of the composite image of the white color at the gray level "0" through the gray level "7," specifically, the RGB values based on the imaging data of the composite image E1 of the white color. The values represented by the white balance characteristics to the target become an example of the values of the colors of the second image.

According to this aspect, it is possible to reduce the difference between the color of the composite image E1 and the color of the composite image E2.

It should be noted that it is possible to omit either one of the first projector 1A and the second projector 1B.

B2: Second Modified Example

In the first embodiment and the first modified example, it is possible to use a white-colored image as the correction image. In this case, it is possible to decrease the number of times of projection of the correction images compared to the configuration of projecting the red image, the green image, and the blue image as the plurality of correction images.

B3: Third Modified Example

Although the liquid crystal light valves 145 are used as an example of the light modulation device in the projector 1 in the first embodiment and the first through second modified examples, the light modulation device is not limited to the liquid crystal light valves, and can arbitrarily be changed. For example, it is also possible for the light modulation device to have a configuration using three reflective liquid crystal panels. Further, it is also possible for the light modulation device to have a configuration such as a system using a single liquid crystal panel, a system using three digital mirror devices (DMD), or a system using a single digital mirror device. When using just one liquid crystal panel or DMD as the light modulation device, the members corresponding to the color separation optical system and the color combining optical system are unnecessary. Further, besides the liquid crystal panel or the DMD, any configurations capable of modulating the light emitted by the light source 144 can be adopted as the light modulation device.

What is claimed is:

1. A method of operation of a control device configured to control a plurality of projectors, the method comprising:
    making each of the plurality of projectors project one or more first images based on first image information to a first area;
    generating color correction data used to correct a color of images projected. by the plurality of projectors based on imaging data generated by a camera imaging the first area where the first images are projected by the plurality of projectors; and
    counting a number of times of reception of a projection instruction which equals a reception count value, the reception count value corresponds to the color of the images.

2. The method of operation of the control device according to claim 1, wherein
    the first image information includes red image information representing a red-colored image, green image information representing a green-colored image, and blue image information representing a blue-colored image,
    the first images includes the red image based on the red image information, the green image based on the green image information, and the blue image based on the blue image information,
    each of the plurality of projectors is made to project the red image, the green image, and the blue image to the first area at respective timings different from each other, and
    the color correction data is generated based on red image imaging data generated by the camera imaging the first area where the red image is projected from each of the projectors, green image imaging data generated by the camera imaging the first area where the green image is projected from each of the projectors, and blue image imaging data. generated by the camera imaging the first area where the blue image is projected from each of the projectors.

3. The method of operation of the control device according to claim 2, further comprising:
    calculating a total value of a value of a color represented by the red image imaging data, a value of a color represented by the green image imaging data, and a value of a color represented by the blue image imaging data, wherein
    the color correction data is generated based on a relationship between the total value and a target value.

4. The method of operation of the control device according to claim 3, wherein
    the target value is a fixed value.

5. The method of operation of the control device according to claim 3, further comprising:
   identifying a value of a color of a second image projected from one or more other projectors different from the plurality of projectors to a second area different from the first area, wherein
   the value of the color of the second image is used as the target value.

6. The method of operation of the control device according to claim 1, further comprising:
   providing the color correction data to the plurality of projectors.

7. A control device comprising:
   a processor configured to make each of a plurality of projectors project one or more first images to a first area, generate color correction data used to correct a color of images projected by the plurality of projectors based on imaging data generated by a camera imaging the first area where the first images are projected by the plurality of projectors, and count a number of times of reception of a projection instruction which equals a reception count value, the reception count value corresponds to the color of the images.

* * * * *